UNITED STATES PATENT OFFICE.

CHARLES VERO AND JAMES EVERITT, OF ATHERSTONE, COUNTY OF WARWICK, ENGLAND.

MANUFACTURE OF SMOOTH-FACED NAPLESS FELT BODIES.

SPECIFICATION forming part of Letters Patent No. 291,431, dated January 1, 1884.

Application filed October 17, 1883. (No specimens.) Patented in France July 18, 1883, No. 156,596; in England August 22, 1883, No. 4,072; in Belgium August 25, 1883, No. 62,411, and in Germany August 25, 1883.

*To all whom it may concern:*

Be it known that we, CHARLES VERO and JAMES EVERITT, subjects of the Queen of Great Britain, residing at Atherstone, in the county of Warwick, England, have invented certain new and useful Improvements in the Manufacture of Smooth-Faced Napless Felt Bodies, used for soft, flexible, and hard hats, (for which we have secured Letters Patent in Great Britain, No. 4,072, dated August 22, 1883; in France a patent of addition, dated September 3, 1883, to Patent No. 156,596, dated July 18, 1883; in Belgium, No. 62,411, dated August 25, 1883, and in Germany, dated August 25, 1883;) and we do hereby declare that the following is a full, clear, and exact description of the invention, which will enable others skilled in the art to which it appertains to make and use the same.

In our former specification, on which we obtained Patent No. 284,924, dated September 11, 1883, we described means for manufacturing smooth-faced napless felt bodies. Our present invention has for its object to improve the means employed for manufacturing such napless fur-covered hat-bodies. For this purpose we place a previously-hardened conical body, of wool or mixed wool and hair, onto the cone of a fur-former, and blow onto the same the required amount of fur. We then wrap wet flannels around the covering of fur, and put over them a perforated metal cover, as described in our former specification. The cones, with the partially-formed body between them, we next place over a steam-jet, and through it admit steam to the interior of the inner cone. The steam penetrates through the perforations of this cone and into the hat-body. The operative then removes them from the steam-jet and places them on a flat table, holding the inner cone firm against the edge of the table with his left hand, and with his right hand vibrates the top cover with a to-and-fro motion over the flannels. In a very short time this motion and the steam-heat combined will have sufficiently consolidated the covering of fur to allow of the body being taken off from the forming-cone and placed onto a machine, known as the "tip-hardener," after which, instead of using the flat hardener to complete the hardening operation, as described in our former specification, we place the conical hat-body onto the perforated steam-heated and canvas-covered cone of a hardening-machine, in which the body is, while heated by steam, rubbed between two conical surfaces; and in this way the operation of hardening is effected at one operation, and is effected more evenly and expeditiously than by the means described in our former specification. A machine of this kind is described in the specification of an English Patent No. 2,525, in the year 1882.

In place of depositing fur onto the exterior of previously-hardened bodies by blowing fur onto them, as above described, we in some cases take light bodies of pure fur that have been formed, dipped into hot water, and partially hardened or settled in the usual manner and place them over the previously-hardened bodies, and act upon them by conical surfaces in the manner described above. We first place the hardened wool, or mixed wool and fur body, over the cone of the conical hardening-machine referred to, and place over it the partially-hardened fur body, taking care both are level and free from creases. We then place over the two bodies the closely-fitting cup or conical cover and put the machine in motion, so as to give to the cup or conical cover an oscillatory revolving motion, which thoroughly hardens the two bodies together.

The light bodies of pure fur, in place of being made in the ordinary way, might be made by blowing the required amount of fur onto a forming-cone and then wrapping them round with wetted flannels and hardening over a steam-jet. Afterward we remove the steam hardened or settled fur body and place it over the wool or mixed body, as described, on the conical hardener and harden the two bodies together. Subsequently the completion of the felting operation is effected in the ordinary manner.

We claim—

1. The process of consolidating a covering of fur with a hardened and unfelted body, that is carried upon a perforated metal cone, or of consolidating a covering of fur that has been blown onto a perforated metal cone, the process consisting in wrapping wet flannels around the covering and placing over them another perforated metal cone, next admitting steam to the interior of the inner cone, and afterward working the outer cover to and fro.

2. The process of still further consolidating or combining a fur cover with a hardened and unfelted body, consisting in placing the previously hardened and unfelted body of wool or mixed wool and hair that has had a covering of fur partially secured to it onto a steam-heated perforated and canvas-covered cone, and over it placing a conical closely-fitting metal cover, to which an oscillatory revolving motion is then given to harden the bodies together.

3. The process of manufacturing napless fur-covered hat-bodies, consisting in mounting a previously-hardened body of wool, or mixed wool and hair, onto a steam-heated perforated and canvas-covered cone, and stretching over this a partially-hardened fur body, and over it placing a conical closely-fitting metal cover, to which an oscillatory revolving motion is then given to consolidate the two bodies together.

CHARLES VERO.
JAMES EVERITT.

Witnesses:
  JOHN C. FOUKE,
    *Solicitor, Birmingham.*
  JAS. STOBIE,
    *His Clerk.*